UNITED STATES PATENT OFFICE.

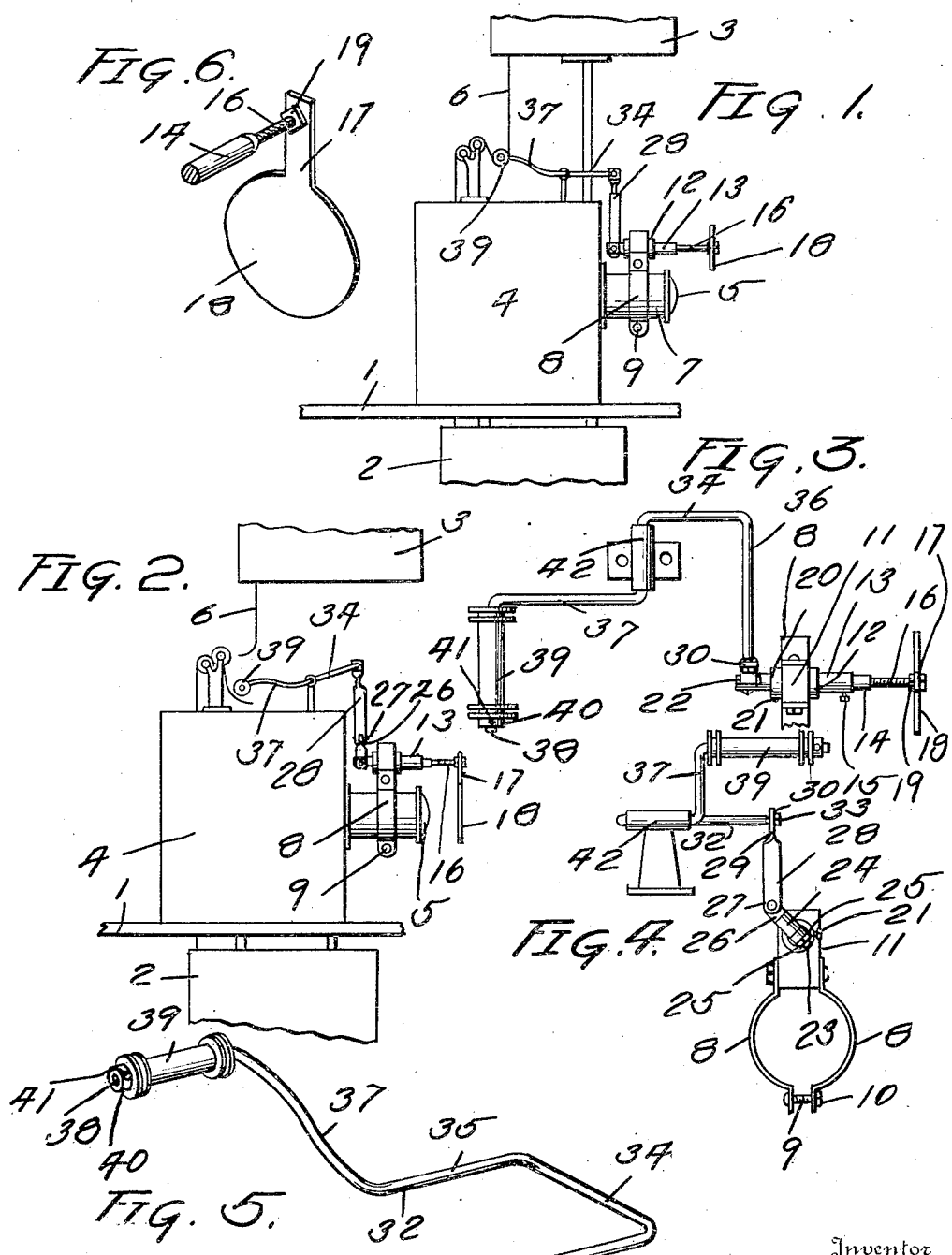

DOUGLAS R. COLLINS AND GOVE S. BOYLAN, OF SALISBURY, NORTH CAROLINA.

ATTACHMENT FOR MOVING-PICTURE MACHINES.

1,202,363.  Specification of Letters Patent.  Patented Oct. 24, 1916.

Application filed May 17, 1915. Serial No. 28,674.

*To all whom it may concern:*

Be it known that we, DOUGLAS R. COLLINS and GOVE S. BOYLAN, citizens of the United States, residing at Salisbury, in the county of Rowan, State of North Carolina, have invented certain new and useful Improvements in Attachments for Moving-Picture Machines; and we do hereby declare the following to be a full, clear, and exact description of the invention, such as will enable others skilled in the art to which it appertains to make and use the same.

This invention relates to certain novel and useful improvements in an attachment adapted to be used in connection with moving picture machines for the purpose of automatically cutting off the light rays thrown on the screen, should the film rupture or break, or run out.

In carrying out our invention it is our purpose to provide an attachment including a shutter which is adapted to work in juxtaposition to the lens of the projecting machine, and which shutter, when the film is working properly, is normally held open or in inoperative position, but should the film break or run out, the shutter will drop into position in front of the lens, thereby cutting off the light from the picture screen, thus eliminating the sudden glare in the eyes of the audience which otherwise results when the film breaks.

A further object of our invention is to provide an attachment of this class which is controlled by and will be operated upon the breaking or running out of the film to automatically cut off the light from the screen.

Another object of our invention is the provision of a simple, efficient and reliable attachment of this character which may be applied to any well known or standard form of moving picture machine, and which embodying as it does but relatively few parts, may be manufactured and marketed at a relatively low cost.

With the above recited objects and others of a similar nature in view, our invention consists in the construction, combination and arrangement of parts set forth in and falling within the scope of the appended claims.

In the accompanying drawings: Figure 1 is a view in side elevation of a conventional form of moving picture machine, and showing our attachment applied thereto, with the shutter in the inoperative position it occupies when the film is working properly. Fig. 2 is a similar view showing the shutter closed or in operative position when the film breaks or runs out. Fig. 3 is a top plan view of our attachment. Fig. 4 is a rear view of the invention. Fig. 5 is a perspective view of the crank arm of the attachment. Fig. 6 is a perspective view of the shutter and the shaft thereof.

Before entering into a detailed description of our invention, we will briefly state that the device embodies, among other features, a movable shutter which is adapted to be supported in front of the lens of the projecting machine, and this shutter is connected through certain intermediate mechanism with a spool or roller which is adapted to bear against the traveling film when the latter is operating normally, as in exhibiting the pictures. So long as the film remains unbroken, and is operating as usual, the shutter is held in inoperative position or away from the lens by the roller or spool and the intermediate mechanism above mentioned. Should the film break or run out, however, and thus no longer support the roller or spool, the latter with the intermediate mechanism, above mentioned, will, of course, fall and consequently the shutter will be brought into position in front of the lens to cut off the light from the screen.

In the accompanying drawings we have simply conventionally illustrated the projecting portion of a moving picture machine, as it is, of course, to be understood that this invention may be employed in any connection with any well known type of moving picture machine.

Referring now to the accompanying drawings in detail, the numeral 1 designates, in general the supporting frame of the machine, while the lower film reel casing is shown at 2, and the upper film reel casing at 3. The projector is indicated as an entirety by the numeral 4, and is provided with the usual lens 5, while the film is shown at 6.

Fastened to the lens tube 7 are the bowed clamping arms 8—8 connected at their lower ends by means of the screw 9, provided with the thumb nut 10. Fastened between the upper ends of the clamping arms 8—8 is a block 11, bored horizontally for the passage of the bearing tube 12. Extending through this tube 12 and rotatable therein, is a relatively long sleeve 13 in the forward or outer end of which is fitted the spindle 14, the said spindle being fastened to the sleeve by means of the set screw 15. The outer end of the spindle is reduced and threaded as at 16, and fitted on the threaded section of the spindle is the arm 17 of the shutter disk 18, the arm being confined and held between the nuts 19, threaded on the spindle. The longitudinal movement of the sleeve relative to the bearing tube is prevented by means of the collars 20, fastened by set screws 21. Socketed in the rear end of the sleeve 13 is a flattened shank 22, bored for the passage of the reduced end 23 of the stud 24, this reduced end being threaded and provided with a nut 25. The opposite end of the stud is flattened as at 26, and fits in the bifurcated end 27 of the link 28, the opposite end of said link being twisted and flattened as at 29, and formed with an eye 30 to receive the reduced threaded end 31 of the crank arm 32, a nut 33 being threaded onto the end of the arm to fasten the link thereto. This arm 32 is prferably formed of a single piece of metal, such as wire rod or the like, which is bent to form a lower U-shaped section 34, the bar 35 of which is shorter than the bar 36 parallel therewith, the wire rod being bent from the shorter arm 34 as at 37, and then laterally and horizontally as at 38, to form a shaft for the spool or roller 39 mounted thereon, and which roller is adapted to bear against the film when the latter is in its taut or unbroken state. A collar 40 is threaded on the end of the shaft 38 and is fastened by means of a set screw 41.

The short bar 34 of the U-shaped section of the arm 32 is provided with a bracket 42 which is adapted to be fastened to the projecting machine, and in which bracket the entire arm may swing or rock.

From the above description, taken in connection with the accompanying drawings, the construction and operation of my device will be readily apparent to those skilled in the art. When the device is assembled as shown in Fig. 1, it will be seen that the roller or spool at the upper end of the crank arm 32 rests against the film 6. Under such condition the connections between this roller or spool and the shutter tend to hold the latter in inoperative position or away from the front of the lens. Should the film break or run out, however, the roller will drop down by gravity, and the arm 32 rocking in the bracket 42, will, through the connections for the shaft or spindle of the shutter, move the shutter in front of the lens and thereby cut off the light from the screen.

It will be seen that we have provided an exceedingly simple, yet efficient attachment for the purpose intended, as hereinbefore mentioned, and it will furthermore be seen that the device is such that it may be applied to any well known form of moving picture machine.

While we have herein shown and described one particular embodiment of our invention, we wish it to be understood that we do not confine ourselves to all the precise details of construction herein set forth by way of illustration, as modification and variation may be made without departing from the spirit of the invention, or exceeding the scope of the appended claims.

What we claim is:

1. The combination with the projector head of a moving picture machine, of a support removably engaged with the barrel of the objective end, a rod revolubly mounted in the support and extending longitudinally of the barrel, and extending beyond the lens, a shutter carried by the outer end of the rod for movement into and out of position to extend over the lens when the rod is rocked, a lateral member carried by the inner end of the rod, a link pivoted to the lateral member, a member pivoted between its ends upon the projector head, one end of said member being pivotally connected with the link and a roller carried by the opposite end of the member in position for engagement of a film passing through the head in such a way as to hold the roller with the member against pivotal movement in one direction.

2. A shutter attachment for moving picture projector heads comprising a bearing element adapted for removable engagement with the barrel of the objective lens, a rod revolubly mounted in said bearing element, a lateral shutter carried by one end of the rod, a lateral arm carried by the opposite end of the rod, a bracket adapted for removable attachment to a projector head, a member pivoted between its ends in the bracket, link connections between one end of said member and the lateral arm and a film roller carried by the other end of the member.

In testimony whereof, we affix our signatures, in the presence of two witnesses.

DOUGLAS R. COLLINS.
GOVE S. BOYLAN.

Witnesses:
 GEO. R. COLLINS,
 E. HARDIN.